United States Patent [19]
Janiszewski

[11] 3,981,210
[45]*Sept. 21, 1976

[54] GUIDE MEANS FOR BORING BARS

[76] Inventor: Kasimir Janiszewski, 11908 W. Loomis Road, Franklin, Wis. 53132

[ * ] Notice: The portion of the term of this patent subsequent to Mar. 5, 1991, has been disclaimed.

[22] Filed: Sept. 12, 1974

[21] Appl. No.: 505,393

[52] U.S. Cl. ................................. 82/1.4; 408/82; 408/241 B
[51] Int. Cl.² .......................................... B23B 41/06
[58] Field of Search ............... 408/241 B, 200, 201, 408/202, 203, 82, 113, 114, 115, 72, 159; 82/241 B, 200, 201, 202, 203, 82, 113, 114, 115, 72, 159, 77, 78, 79, 241 R, 241 C, 3

[56] References Cited
UNITED STATES PATENTS

| | | | |
|---|---|---|---|
| 2,152,954 | 4/1939 | Campbell | 408/78 X |
| 2,234,039 | 3/1941 | Busjaeger | 408/159 X |
| 2,257,609 | 9/1941 | Kollath | 408/202 X |
| 2,395,751 | 2/1946 | Newcomer | 408/241 R |
| 2,643,554 | 6/1953 | Sperisen | 408/241 X |
| 2,747,948 | 5/1956 | Jergens | 408/82 X |
| 3,795,160 | 3/1974 | Janiszewski | 82/1.4 |
| 3,935,764 | 2/1976 | Janiszewski | 82/1.4 X |

FOREIGN PATENTS OR APPLICATIONS

| | | | |
|---|---|---|---|
| 903,395 | 12/1953 | Germany | 82/35 |
| 1,283,076 | 11/1968 | Germany | 408/241 C |

*Primary Examiner*—Othell M. Simpson
*Assistant Examiner*—W. R. Briggs
*Attorney, Agent, or Firm*—Henry C. Fuller

[57] ABSTRACT

A boring bar has a free end that extends beyond the boring tool and has a guide roller rotatably mounted on the free end about an axis which is parallel to and offset from the boring bar axis. A guide bushing is supported in concentric alignment with the free end of the boring bar and rollably engages the guide roller at a point whose radius with respect to the boring bar axis extends in the same direction as the boring tool. The boring bar is preferably necked down between its supported end and the boring tool to facilitate deflection of the boring bar in response to pressure applied to the free end thereof by the guide roller and guide bushing.

6 Claims, 4 Drawing Figures

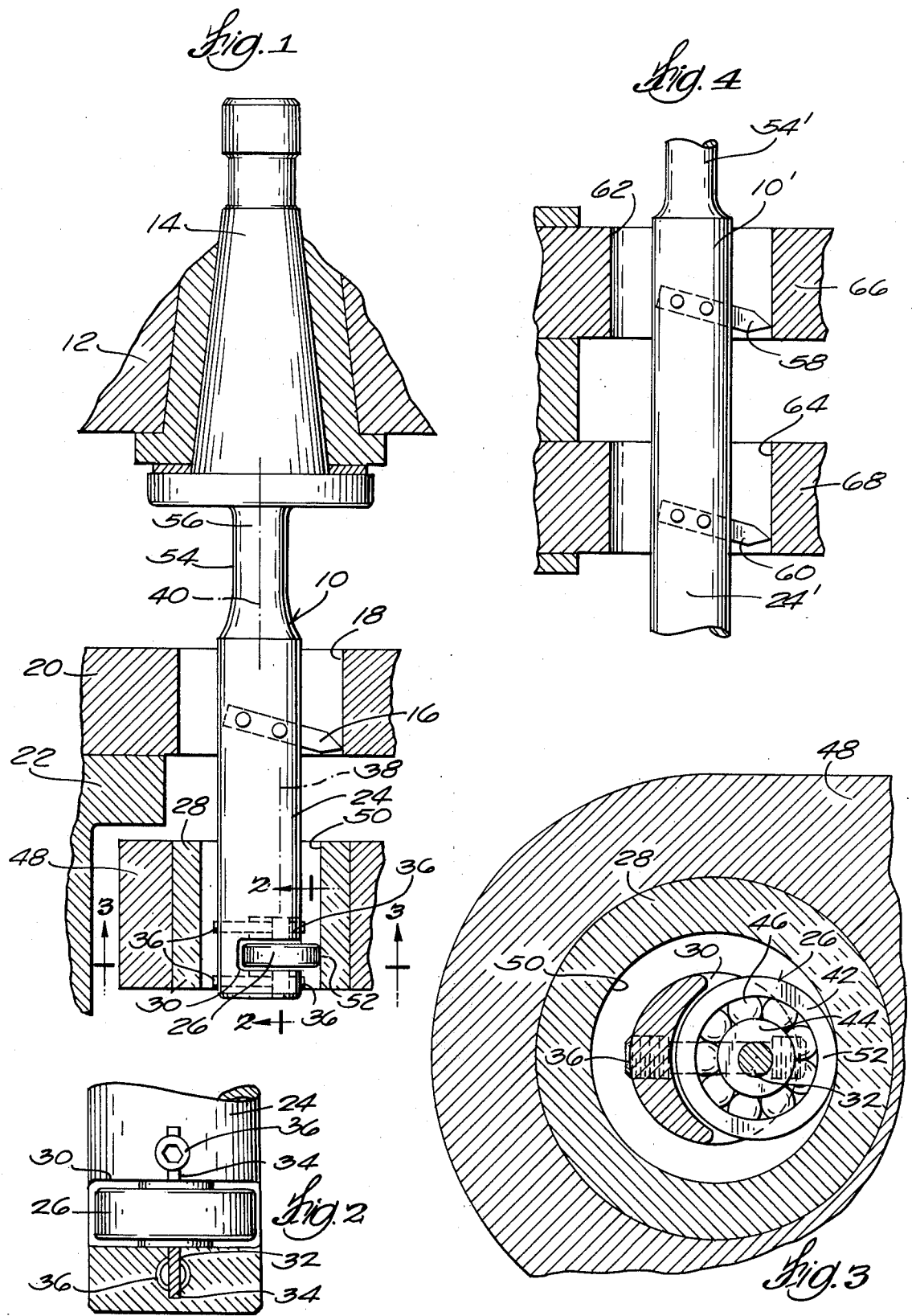

GUIDE MEANS FOR BORING BARS

BACKGROUND OF THE INVENTION

This invention relates to guide means for boring bars and is an improvement on the boring bar guide means disclosed in my U.S. Pat. No. 3,795,160 which issued on Mar. 5, 1974. The above-noted patent discloses a boring bar which has a free end that extends beyond the boring tool and has a guide bushing supported in concentric alignment with said free end. A guide element with a rounded end projects from the free end of the boring bar in the same direction as the boring tool and slideably engages the inside surface of the guide bushing to guide the boring tool, thereby enabling the boring of more accurate cylindrical or tapered holes. However, due to the sliding contact between the guide element and the inner surface of the guide bushing, the accuracy of this guide means tends to decrease each time it is used to wear on the end of the guide element and on the inner surface of the guide bushing.

SUMMARY OF THE INVENTION

To overcome the problem of wear on the guide element and guide bushing, a guide roller is rotatably mounted on the free end of the boring bar and is positioned to rollably engage the inner surface of the guide bushing at a point in the same radial direction with respect to the boring bar axis as the boring tool.

Further objects, advantages and features of the invention will become apparent from the following disclosure.

DESCRIPTION OF THE DRAWINGS

FIG. 1 is a longitudinal sectional view of a boring bar equipped with one embodiment of the guide means of this invention.

FIG. 2 is an axial sectional view taken on the line 2—2 of FIG. 1.

FIG. 3 is a cross-sectional view taken on the line 3—3 of FIG. 1.

FIG. 4 is a fragmentary longitudinal sectional view of a boring bar having two boring tools.

DESCRIPTION OF THE PREFERRED EMBODIMENTS

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

FIG. 1 shows a boring bar 10 mounted for rotary movement and longitudinal movement in a conventional chuck 12 on a conventional boring tool holder 14. Boring bar 10 has a conventional boring tool 16 projecting radially therefrom for boring a hole 18 in a workpiece 20 supported by a conventional support 22. Boring bar 10 has a free end 24 that extends beyond boring tool 16 and carries the improved guide means of this invention, which includes a guide roller 26 and a guide bushing 28. Guide roller 26 is rotatably mounted in a radial slot 30 in the free end 24 of boring bar 10 and is freely rotatable about an axle 32 (FIG. 2) which is adjustably secured within two slots 34 by four set screws 36. The set screws 36 are adjusted to position axle 32 so that its axis 38 (FIG. 1) is substantially parallel to and offset from the longitudinal axis 40 of boring bar 10.

As shown in FIG. 3, guide roller 26 has an outer race 42, an inner race 44 which is attached to axle 32, and a plurality of anti-friction elements 46 which rotatably link outer race 44 and inner race 44.

Guide bushing 28 is supported by a conventional support 48 in substantially concentric alignment with the free end 24 of boring bar 10. Guide roller 26 rollably engages the inner surface 50 of guide bushing 28 at a point 52 whose radius with respect to boring bar axis 40 extends in the same direction as tool 16. The inner surface 50 of guide bushing 28 can be either cylindrical or tapered, depending on whether it is desired to bore a cylindrical hole or a tapered hole. In either case, guide roller 26 controls the deflection of boring bar 10 to accurately guide boring tool 16 along the desired surface. Preferably, boring bar 10 is necked down or reduced in diameter at 54 between its supported end 56 and boring tool 16 to facilitate deflection of boring bar 10 in response to pressure applied to the free end 24 thereof by guide rollers 26 and guide bushing 28.

The increase in accuracy due to guide roller 26 makes it possible to extend the shaft of boring bar 10 far enough to accommodate two boring tools 58 and 60 (FIG. 4) which are positioned to simultaneously bore two holes 62 and 64 in separate axially spaced workpieces 66 and 68. Although the guide means for boring bar 10' is not shown in FIG. 4, the guide means therefor is the same as shown in FIGS. 1–3.

In use, the inner surface 50 of guide bushing 28 is first accurately dimensioned to the desired form, either cylindrical or tapered as desired. Inner surface 50 need not be the same size as the bored hole 18 but can be smaller as shown in FIG. 1, or larger if desired. After inner surface 50 has been accurately dimensioned, it is accurately positioned concentric with the longitudinal axis 40 of boring bar 10 by conventional support means partially shown at 48. The set screws 36 of guide roller 26 are adjusted when guide roller 26 is clear of guide bushing 28 so as to adjust the deflection of boring bar 10 due to pressure applied to guide roller 26 so that boring tool 16 will accurately follow the pattern set by guide surface 50. Boring tool 16 is then moved into contact with workpiece 20 and is rotated and moved longitudinally downward through workpiece 20 to bore the desired hole 18 therethrough. As boring bar 10 is rotated and moved longitudinally downward, guide roller 26 follows a helical path around the inside of guide surface 50 and holds boring tool 16 in the proper position throughout the boring operation.

What is claimed is:

1. In apparatus for boring holes including a rotatable and longitudinally movable boring bar having a radially projecting tool for engaging and removing material from a bore in a workpiece and having a free end that extends beyond said tool and having guide means to guide said tool, the improvement wherein said guide means comprises a guide bushing separate from the workpiece and having an axis supported in generally coaxial alignment with said boring bar around the free end thereof, and a guide roller rotatably attached adjacent the free end of said boring bar for rotation about an axis parallel to and eccentric with respect to the axis of rotation of said bar and for longitudinal movement with said boring bar and within said guide bushing and rollably engaged with the interior surface of said guide bushing at a point located generally in the same axial plane and the same radial direction as said projecting tool with said contact point shifting longitudinally along said interior surface of said guide bushing as said boring bar moves through the workpiece to form a surface in the workpiece complementary in shape to the surface of the guide bushing.

2. The apparatus of claim 1 wherein said guide roller is rotatably mounted on an axle, the free end of said boring bar being slotted to receive said axle and said guide roller, and the free end of said boring bar having threaded openings therein for receiving a plurality of set screws to bear against opposite ends of said axle to adjust the position thereof.

3. The apparatus of claim 2 wherein there are four set screws positioned in opposing pairs on opposite ends of each axle, each set screw being positioned to bear against the adjacent end of said axle.

4. The apparatus of claim 1 in which said guide roller has an anti-friction construction including an outer race, an inner race, and a plurality of anti-friction coupling elements rotatably linking said inner race to said outer race.

5. The apparatus of claim 1 and further comprising a second boring tool projecting radially from said boring bar in the same direction as the first-mentioned boring tool, said second boring tool being positioned to engage and remove material from a bore in a second workpiece which is axially spaced from the first-mentioned workpiece.

6. The apparatus of claim 1 wherein said boring bar is reduced in diameter between the supported end thereof and said boring tool to facilitate deflection of said boring bar in response to pressure applied to the free end thereof by said guide roller and guide bushing.

* * * * *